United States Patent
Pokorny et al.

(10) Patent No.: US 7,277,141 B2
(45) Date of Patent: Oct. 2, 2007

(54) OPTICAL BODIES CONTAINING CHOLESTERIC LIQUID CRYSTAL MATERIAL AND METHODS OF MANUFACTURE

(75) Inventors: Richard J. Pokorny, Maplewood, MN (US); Marc D. Radcliffe, Newport, MN (US); Philip E. Watson, St. Paul, MN (US); Christopher C. Bowley, Norfolk, MA (US); Ikuko Ebihara, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 11/141,578

(22) Filed: May 31, 2005

(65) Prior Publication Data

US 2006/0197903 A1 Sep. 7, 2006

Related U.S. Application Data

(63) Continuation of application No. 09/791,157, filed on Feb. 22, 2001, now Pat. No. 6,917,399.

(51) Int. Cl.
*G02F 1/1335* (2006.01)
*G09K 19/02* (2006.01)
*G02B 5/30* (2006.01)

(52) U.S. Cl. .................. 349/96; 349/175; 349/115; 359/437

(58) Field of Classification Search .......... 349/96, 349/175, 115; 359/487, 501, 437
See application file for complete search history.

(56) References Cited

U.S. PATENT DOCUMENTS

| 0,540,768 A | 6/1895 | Western |
| 3,124,639 A | 3/1964 | Kahn ............................. 88/65 |
| 3,508,947 A | 4/1970 | Huhges ........................ 117/34 |
| 3,610,729 A | 10/1971 | Rogers ........................ 350/157 |
| 3,711,176 A | 1/1973 | Alfrey et al. .................. 350/1 |

(Continued)

FOREIGN PATENT DOCUMENTS

CN 1095164 A 11/1994

(Continued)

OTHER PUBLICATIONS

Schrenk et al., Nanolayer Polymeric Optical Films, Tappi Journal, pp. 169-174, Jun. 1992.

(Continued)

*Primary Examiner*—Mike Qi
(74) *Attorney, Agent, or Firm*—Robert J. Pechman

(57) ABSTRACT

An optical body includes a substrate and a cholesteric liquid crystal layer disposed on the substrate. The cholesteric liquid crystal layer has a non-uniform pitch along a thickness direction of the layer and comprises a crosslinked polymer material that substantially fixes the cholesteric liquid crystal layer. The crosslinking hinders diffusion of cholesteric liquid crystal material within the cholesteric liquid crystal layer. In other methods of making an optical body, a reservoir of chiral material is provided during the process over a first cholesteric liquid crystal layer to diffuse into the layer and provide a non-uniform pitch. Alternatively, two coating compositions can be disposed on a substrate where the material of the first coating composition is not substantially soluble in the second coating composition.

10 Claims, 7 Drawing Sheets

U.S. PATENT DOCUMENTS

| | | | |
|---|---|---|---|
| 3,860,036 A | 1/1975 | Newman, Jr. | 138/45 |
| 3,996,885 A | 12/1976 | Jackson et al. | 118/50 |
| 4,001,024 A | 1/1977 | Dittman et al. | 96/87 |
| 4,293,435 A | 10/1981 | Portugall et al. | 252/299.01 |
| 4,446,305 A | 5/1984 | Rogers et al. | 528/348 |
| 4,520,189 A | 5/1985 | Rogers et al. | 528/331 |
| 4,521,588 A | 6/1985 | Rogers et al. | 528/363 |
| 4,525,413 A | 6/1985 | Rogers et al. | 428/212 |
| 4,720,426 A | 1/1988 | Englert et al. | 428/344 |
| 4,974,941 A | 12/1990 | Gibbons et al. | 350/349 |
| 5,032,009 A | 7/1991 | Gibbons et al. | 350/341 |
| 5,188,760 A | 2/1993 | Hikmet et al. | 252/299.01 |
| 5,211,878 A | 5/1993 | Reiffenrath et al. | 252/299.63 |
| 5,235,443 A | 8/1993 | Barnik et al. | 359/37 |
| 5,269,995 A | 12/1993 | Ramanathan et al. | 264/171 |
| 5,294,657 A | 3/1994 | Melendy et al. | 524/270 |
| 5,316,703 A | 5/1994 | Schrenk | 264/1.3 |
| 5,319,478 A | 6/1994 | Funfschilling et al. | 359/53 |
| 5,332,522 A | 7/1994 | Chen et al. | 252/299.01 |
| 5,389,324 A | 2/1995 | Lewis et al. | 264/171 |
| 5,389,698 A | 2/1995 | Chigrinov et al. | 522/2 |
| 5,448,404 A | 9/1995 | Schrenk et al. | 359/584 |
| 5,486,935 A | 1/1996 | Kalmanash | 359/37 |
| 5,486,949 A | 1/1996 | Schrenk et al. | 359/498 |
| 5,602,661 A | 2/1997 | Schadt et al. | 349/124 |
| 5,612,820 A | 3/1997 | Schrenk et al. | 359/498 |
| 5,629,055 A | 5/1997 | Revol et al. | 428/1 |
| 5,686,979 A | 11/1997 | Weber et al. | 349/96 |
| 5,699,188 A | 12/1997 | Gilbert et al. | 359/584 |
| 5,721,603 A | 2/1998 | De Vaan et al. | 349/194 |
| 5,737,044 A | 4/1998 | Van Haaren et al. | |
| 5,741,549 A | 4/1998 | Maier et al. | 427/294 |
| 5,744,057 A | 4/1998 | Meyer et al. | 252/299 |
| 5,744,534 A | 4/1998 | Ishiharada et al. | 524/442 |
| 5,751,388 A | 5/1998 | Larson | 349/96 |
| 5,767,935 A | 6/1998 | Ueda et al. | 349/112 |
| 5,770,306 A | 6/1998 | Suzuki et al. | 428/326 |
| 5,780,629 A | 7/1998 | Etzbach et al. | 544/296 |
| 5,783,120 A | 7/1998 | Ouderkirk et al. | 264/134 |
| 5,793,456 A | 8/1998 | Broer et al. | 349/98 |
| 5,798,147 A | 8/1998 | Beck et al. | 427/511 |
| 5,808,794 A | 9/1998 | Weber et al. | 359/487 |
| 5,812,233 A * | 9/1998 | Walsh et al. | 349/194 |
| 5,825,444 A | 10/1998 | Broer et al. | |
| 5,825,542 A | 10/1998 | Cobb, Jr. et al. | 359/487 |
| 5,825,543 A | 10/1998 | Ouderkirk et al. | 359/494 |
| 5,838,407 A | 11/1998 | Chigrinov et al. | 349/187 |
| 5,847,068 A | 12/1998 | Maxein et al. | 528/69 |
| 5,867,316 A | 2/1999 | Carlson et al. | 359/500 |
| 5,882,774 A | 3/1999 | Jonza et al. | 428/212 |
| 5,886,242 A | 3/1999 | Etzbach et al. | 585/25 |
| 5,940,149 A | 8/1999 | Vanderwerf | 349/5 |
| 5,958,293 A | 9/1999 | Gibbons et al. | 252/299.4 |
| 5,962,114 A | 10/1999 | Jonza et al. | 428/212 |
| 5,965,247 A | 10/1999 | Jonza et al. | 428/212 |
| 6,001,277 A | 12/1999 | Ichimura et al. | 252/299.4 |
| 6,088,079 A * | 7/2000 | Kameyama et al. | 349/185 |
| 6,096,375 A | 8/2000 | Ouderkirk et al. | 427/163.1 |
| 6,111,697 A | 8/2000 | Merrill et al. | 359/497 |
| 6,113,679 A | 9/2000 | Adkins et al. | 106/31.6 |
| 6,181,395 B1 | 1/2001 | Li et al. | 349/98 |
| 6,392,725 B1 | 5/2002 | Harada | 349/74 |
| 6,459,461 B1 | 10/2002 | Umemoto | 349/65 |
| 6,466,297 B1 | 10/2002 | Goulding | 349/175 |
| 6,473,143 B2 * | 10/2002 | Li et al. | 349/88 |
| 6,573,963 B2 | 6/2003 | Ouderkirk et al. | 349/117 |
| 6,862,073 B2 * | 3/2005 | Kashima | 349/194 |
| 2002/0003593 A1 | 1/2002 | Arakawa et al. | 349/65 |
| 2002/0039156 A1 | 4/2002 | Lie et al. | 349/88 |
| 2002/0113937 A1 | 8/2002 | Ouderkirk et al. | 349/187 |

FOREIGN PATENT DOCUMENTS

| | | |
|---|---|---|
| DE | 197 45 647 A1 | 4/1999 |
| EP | 0 606 940 | 7/1994 |
| EP | 0834 754 | 4/1998 |
| EP | 0 860 716 | 8/1998 |
| EP | 0 867 749 | 9/1998 |
| EP | 0 908 745 | 4/1999 |
| EP | 1 058 143 | 6/2000 |
| JP | 8-271731 | 10/1996 |
| JP | 9-133810 | 5/1997 |
| JP | 9-189811 | 7/1997 |
| JP | 9-304770 | 11/1997 |
| JP | 10-54905 | 2/1998 |
| JP | 10-54909 | 2/1998 |
| JP | 10-142407 | 5/1998 |
| JP | 10-158268 | 6/1998 |
| JP | 10-197722 | 7/1998 |
| JP | 10-319233 | 12/1998 |
| JP | 10-319235 | 12/1998 |
| JP | 10-321025 | 12/1998 |
| JP | 10-321026 | 12/1998 |
| JP | 10-339812 | 12/1998 |
| JP | 10-339867 | 12/1998 |
| JP | 11-44816 | 2/1999 |
| JP | 11-52133 | 2/1999 |
| JP | 11-64840 | 3/1999 |
| JP | 11-64841 | 3/1999 |
| JP | 11-109353 | 4/1999 |
| JP | 11-125717 | 5/1999 |
| JP | 11-133231 | 5/1999 |
| JP | 11-160539 | 6/1999 |
| WO | WO 95/27919 | 4/1995 |
| WO | WO 95/17303 | 6/1995 |
| WO | WO 95/17691 | 6/1995 |
| WO | WO 95/17692 | 6/1995 |
| WO | WO 95/17699 | 6/1995 |
| WO | WO 97/01440 | 1/1997 |
| WO | WO 97/01774 | 1/1999 |
| WO | WO 99/36248 | 7/1999 |
| WO | WO 99/36262 | 7/1999 |

OTHER PUBLICATIONS

Weber et al., "Giant Birefringent Optics in Multilayer Polymer Mirrors", Science, vol. 287, Mar. 31, 2000, pp. 2451-2456.

Broer, Dirk J. et al., "Photo-Induced Diffusion in Polymerizing Chiral-Nematic Media," Advanced Materials, vol. 11, No. 7 (1999).

Broer, D. J. et al., "Wirde-band Reflective Polarizers from Cholesteric Polymer Networks with a Pitch Gradient," Nature, vol. 378, No. 30 (Nov. 1995).

* cited by examiner

OPTICAL BODIES CONTAINING CHOLESTERIC LIQUID CRYSTAL MATERIAL AND METHODS OF MANUFACTURE

CROSS REFERENCE TO RELATED APPLICATIONS

This application is a continuation of U.S. application Ser. No. 09/791,157, filed Feb. 22, 2001, now U.S. Pat. No. 6,917,399.

FIELD OF THE INVENTION

The present invention relates to optical bodies containing cholesteric liquid crystals. The present invention also relates to reflective optical polarizers formed by coating of two or more layers of cholesteric liquid crystals or cholesteric liquid crystal precursors.

BACKGROUND OF THE INVENTION

Optical devices, such as polarizers and mirrors, are useful in a variety of applications including liquid crystal displays (LCD's). Liquid crystal displays fall broadly into two categories: backlit (e.g., transmissive) displays, where light is provided from behind the display panel, and frontlit (e.g., reflective) displays, where light is provided from the front of the display (e.g., ambient light). These two display modes can be combined to form transflective displays that can be backlit, for example, under dim light conditions or read under bright ambient light.

Conventional backlit LCDs typically use absorbing polarizers and can have less than 10% light transmission. Conventional reflective LCDs are also based on absorbing polarizers and typically have less than 25% reflectivity. The low transmission or reflectance of these displays reduces display contrast and brightness and can require high power consumption.

Reflective polarizers have been developed for use in displays and other applications. Reflective polarizers preferentially transmit light of one polarization and preferentially reflect light having an orthogonal polarization. It is preferred that reflective polarizers transmit and reflect light without absorbing relatively large amounts of the light. Preferably, the reflective polarizer has no more than 10% absorption for the transmission polarization. Most LCD's operate over a broad range of wavelengths and, as a consequence, the reflective polarizer must typically operate over that broad wavelength range, as well.

In backlit displays, the reflective polarizer can be used to increase the efficiency of light utilization by reflecting the polarization of the light not transmitted by the polarizer back into the backlight. The backlight converts the polarization state of the recycled light for transmission through the reflective polarizer. This light recycling can increase total display brightness. In reflective and transflective displays, the reflective polarizer has lower absorptivity and color than most absorbing polarizers for the pass polarization of light, and can increase brightness of the display by up to 50% or more. Characteristics of reflective polarizers that are important to at least some applications include, for example, the thickness of the polarizer, the uniformity of reflection over a wavelength range, and the relative amount of light reflected over the wavelength range of interest.

SUMMARY OF THE INVENTION

Generally, the present invention relates to optical bodies containing cholesteric liquid crystals and their manufacture, as well as the use of cholesteric liquid crystals in optical devices, such as reflective polarizers.

One embodiment of the invention is a method of making an optical body. First, a cholesteric liquid crystal polymer layer is formed on a substrate using a first coating composition. Next, a second coating composition comprising at least one chiral monomer material selected from reactive chiral monomers is coated on the first layer. Next, a portion of the chiral monomer material is allowed to diffuse into a portion of the first cholesteric liquid crystal polymer layer which is adjacent to the second coating composition. Finally, the chiral monomer material is cured and one or more cholesteric liquid crystal layer(s) are generated from the first cholesteric liquid crystal polymer layer and the second coating composition. The cholesteric liquid crystal layer(s) generated have a non-uniform pitch.

Another embodiment of the invention is another method of making an optical body. First, a first layer is formed on a substrate using a first coating composition which comprises at least one cholesteric liquid crystal material selected from cholesteric liquid crystal compounds and cholesteric liquid crystal monomers. Next, a second coating composition comprising at least one chiral monomer material selected from reactive chiral monomers is coated on the first layer. Next, a portion of the chiral monomer material is allowed to diffuse into a portion of the first layer adjacent to the second coating composition. Finally, the chiral monomer material is crosslinked with the first layer to generate and fix one or more cholesteric liquid crystal layer(s). The cholesteric liquid crystal layer(s) have a non-uniform pitch and the crosslinking substantially hinders further diffusion of any remaining chiral monomer material.

Another embodiment of the invention is another method of making an optical body. First, a layer is formed on a substrate using a first coating composition. Next, a second coating composition is coated onto the first layer. The first and second coating compositions are different and each compositions comprise at least one chiral material selected from chiral compounds. The second coating composition further comprises a solvent, where the first layer is substantially insoluble in the solvent of the second coating composition. Next, a portion of the second coating composition is allowed to diffuse into a portion of the first layer, which is adjacent to the second coating composition. After diffusing, one or more cholesteric liquid crystal layer(s) are formed from the second coating composition and the first layer.

Another embodiment of the invention is an optical body which comprises a substrate and a cholesteric liquid crystal layer disposed on the substrate. The cholesteric liquid crystal layer has a non-uniform pitch along a thickness direction of the layer and comprises a crosslinked polymer material that substantially fixes the cholesteric liquid crystal layer. The crosslinking hinders diffusion of cholesteric liquid crystal material within the cholesteric liquid crystal layer.

Another embodiment of the invention is an optical display which comprises a display medium and a reflective polarizer. The reflective polarizer comprises a substrate and a cholesteric liquid crystal layer disposed on the substrate. The cholesteric liquid crystal layer has a non-uniform pitch along a thickness direction of the layer and comprises a crosslinked polymer material that substantially fixes the cholesteric liquid crystal layer. The crosslinking hinders diffusion of cholesteric liquid crystal material within the cholesteric liquid crystal layer.

The above summary of the present invention is not intended to describe each disclosed embodiment or every implementation of the present invention. The Figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
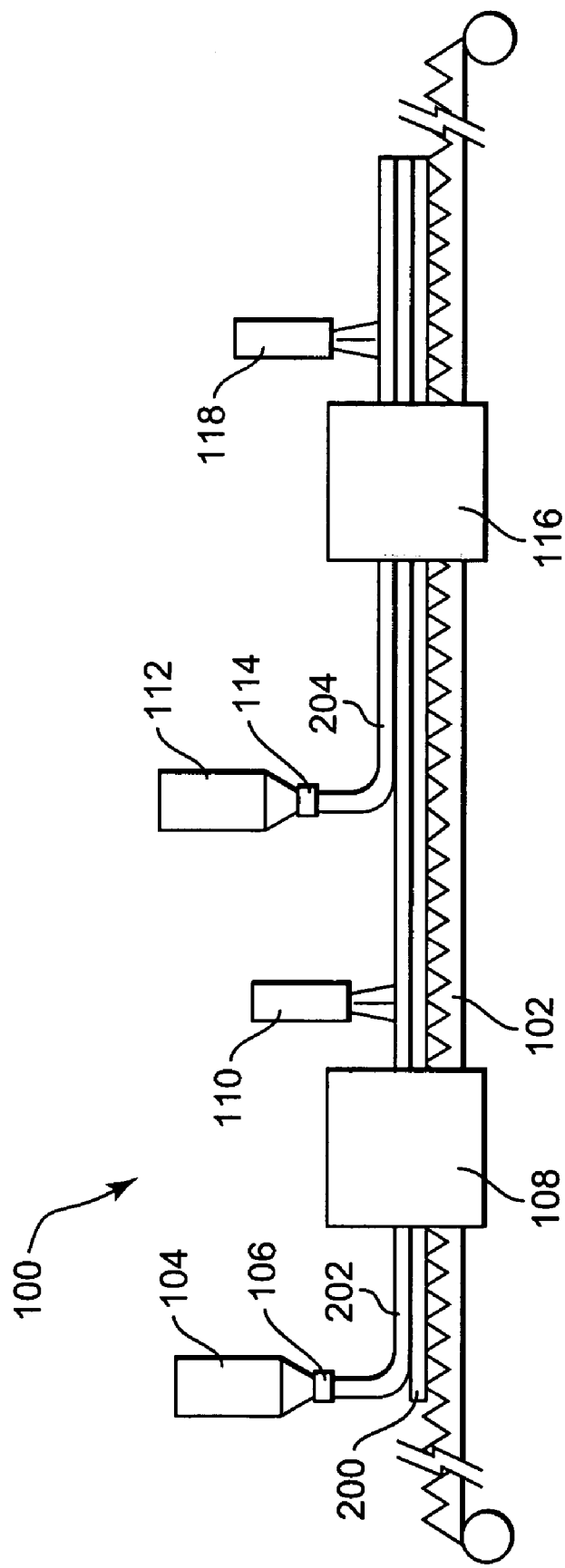
FIG. 1 is a schematic representation of one embodiment of a method and apparatus for sequentially coating two or more cholesteric liquid crystal compositions on a substrate, according to the invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION OF THE PREFERRED EMBODIMENTS

The present invention is believed to be applicable to optical bodies (such as optical films) and their manufacture, as well as the use of the optical bodies in optical devices, such as reflective polarizers and optical displays (e.g., liquid crystal displays). The present invention is also directed to optical bodies containing cholesteric liquid crystals. While the present invention is not so limited, an appreciation of various aspects of the invention will be gained through a discussion of the examples provided below.

The term "polymer" will be understood to include polymers, copolymers (e.g., polymers formed using two or more different monomers), and combinations thereof, as well as polymers or copolymers that can be formed in a miscible blend by, for example, coextrusion or reaction, including transesterification. Both block and random copolymers are included, unless indicated otherwise.

The term "polymeric material" will be understood to include polymers, as defined above, and other organic or inorganic additives, such as, for example, antioxidants, stabilizers, antiozonants, plasticizers, dyes, and pigments.

The term "cholesteric liquid crystal compound" refers to compounds (including polymers) that can form a cholesteric liquid crystal phase.

The term "chiral material" refers to chiral compounds, including chiral liquid crystal compounds and chiral non-liquid crystal compounds, that can form or induce a cholesteric liquid crystal phase in combination with other liquid crystal material.

All index of refraction values are reported for 632.8 nm light unless otherwise indicated.

The term "polarization" refers to plane polarization, circular polarization, elliptical polarization, or any other non-random polarization state in which the electric vector of the beam of light does not change direction randomly, but either maintains a constant orientation or varies in a systematic manner. In plane polarization, the electric vector remains in a single plane, while in circular or elliptical polarization, the electric vector of the beam of light rotates in a systematic manner.

Reflective polarizers preferentially transmit light of one polarization and reflect the remaining light. In the case of reflective plane polarizers, light polarized in one plane is preferentially transmitted, while light polarized in the orthogonal plane is preferentially reflected. In the case of circular reflective polarizers, light circularly polarized in one sense, which may be the clockwise or counterclockwise sense (also referred to as right or left circular polarization), is preferentially transmitted and light polarized in the opposite sense is preferentially reflected. One type of circular polarizer includes cholesteric liquid crystal polarizers.

Cholesteric Liquid Crystal Compounds

Cholesteric liquid crystal materials typically include molecular units that are chiral in nature (e.g., molecules that do not possess a mirror plane) and molecular units that are mesogenic in nature (e.g., molecules that exhibit liquid crystal phases) and can be polymers. Cholesteric liquid crystal compositions include compounds having a cholesteric liquid crystal phase in which the director (the unit vector that specifies the direction of average local molecular alignment) of the liquid crystal rotates in a helical fashion along the dimension perpendicular to the director. Cholesteric liquid crystal compositions are also referred to as chiral nematic liquid crystal compositions. The pitch of the cholesteric liquid crystal compound is the distance (in a direction perpendicular to the director) that it takes for the director to rotate through 360°. This distance is typically 100 nm or more.

The pitch of a cholesteric liquid crystal material can typically be altered by mixing or otherwise combining (e.g., by copolymerization) a chiral compound with a nematic liquid crystal compound. The cholesteric phase can also be induced by a chiral non-liquid crystal material. The pitch depends on the relative ratios by weight of the chiral compound and the nematic liquid crystal compound. The helical twist of the director results in a spatially periodic variation in the dielectric tensor of the material, which in turn gives rise to the wavelength selective reflection of light. For light propagating along the helical axis, Bragg reflection generally occurs when the wavelength, λ, is in the following range $$n_o p < \lambda < n_e p$$

where p is the pitch and $n_o$ and $n_e$ are the principal refractive indices of the cholesteric liquid crystal material. For example, the pitch can be selected such that the Bragg reflection is peaked in the visible, ultraviolet, or infrared wavelength regimes of light.

Cholesteric liquid crystal compounds, including cholesteric liquid crystal polymers, are generally known and typically any of these materials can be used to make optical bodies. Examples of suitable cholesteric liquid crystal polymers are described in U.S. Pat. Nos. 4,293,435 and 5,332, 522, 5,886,242, 5,847,068, 5,780,629, 5,744,057 all of which are incorporated herein by reference. Other cholesteric liquid crystal compounds can also be used. Typically, a cholesteric liquid crystal compound is selected for a particular application or optical body based on one or more factors including, for example, refractive indices, pitch, processability, clarity, color, low absorption in the wavelength of interest, compatibility with other components (e.g., a nematic liquid crystal compound), ease of manufacture, availability of the liquid crystal compound or monomers to form a liquid crystal polymer, rheology, method and requirements of curing, ease of solvent removal, physical and chemical properties (for example, flexibility, tensile strength, solvent resistance, scratch resistance, and phase transition temperature), and ease of purification.

Cholesteric liquid crystal polymers are typically formed using chiral (or a mixture of chiral and achiral) molecules (including monomers) that can include a mesogenic group (e.g., a rigid group that typically has a rod-like structure to facilitate formation of a cholesteric liquid crystal phase). Mesogenic groups include, for example, para-substituted cyclic groups (e.g., para-substituted benzene rings). The mesogenic groups are optionally bonded to a polymer backbone through a spacer. The spacer can contain functional groups having, for example, benzene, pyridine, pyrimidine, alkyne, ester, alkylene, alkene, ether, thioether, thioester, and amide functionalities. The length or type of spacer can be altered to provide different solubilities in solvents.

Suitable cholesteric liquid crystal polymers include polymers having a chiral or achiral polyester, polycarbonate, polyamide, polyacrylate, polymethacrylate, polysiloxane, or polyesterimide backbone that include mesogenic groups optionally separated by rigid or flexible comonomers. Other suitable cholesteric liquid crystal polymers have a polymer backbone (for example, a polyacrylate, polymethacrylate, polysiloxane, polyolefin, or polymalonate backbone) with chiral and achiral mesogenic side-chain groups. The side-chain groups are optionally separated from the backbone by a spacer, such as an alkylene or alkylene oxide spacer, to provide flexibility.

Typically, to form a cholesteric liquid crystal layer, a cholesteric liquid crystal composition is coated or otherwise disposed onto a surface. The cholesteric liquid crystal composition includes a chiral component containing at least one (i) chiral compound, (ii) chiral monomer that can be used (e.g., polymerized or crosslinked) to form a cholesteric liquid crystal polymer, or (iii) a combination thereof. The cholesteric liquid crystal composition can also include a non-chiral component that contains at least one (i) nematic liquid crystal compound, (ii) nematic liquid crystal monomer that can be used to form a nematic liquid crystal polymer, or (iii) a combination thereof. The nematic liquid crystal compound(s) or nematic liquid crystal monomers can be used to modify the pitch of the cholesteric liquid crystal composition. The cholesteric liquid crystal composition can also include one or more additives, such as, for example, curing agents, crosslinkers, antiozonants, antioxidants, plasticizers, stabilizers, and ultraviolet, infrared, or visible light-absorbing dyes and pigments.

Cholesteric liquid crystal compositions can also be formed using two or more different types of any of the following: chiral compounds, achiral compounds, cholesteric liquid crystals, cholesteric liquid crystal monomers, nematic liquid crystals, nematic liquid crystal monomers, latent nematic or chiral nematic materials (in which the latent material exhibits the liquid crystal mesophase in combination with other materials), or combinations thereof. The particular ratio(s) by weight of materials in the cholesteric liquid crystal composition will typically determine, at least in part, the pitch of the cholesteric liquid crystal layer.

The cholesteric liquid crystal composition is generally part of a coating composition that also typically includes a solvent. The term "solvent", as used herein, also refers to dispersants and combinations of two or more solvents and dispersants. In some instances, one or more of the liquid crystals, liquid crystal monomers, processing additives, or any other component of the cholesteric liquid crystal composition also acts as a solvent. The solvent can be substantially eliminated from the coating composition by, for example, drying the composition to evaporate the solvent or reacting a portion of the solvent (e.g., reacting a solvating liquid crystal monomer to form a liquid crystal polymer).

After coating, the cholesteric liquid crystal composition is converted into a liquid crystal layer. This conversion can be accomplished by a variety of techniques including evaporation of a solvent; crosslinking the cholesteric liquid crystal composition; or curing (e.g., polymerizing).the cholesteric liquid crystal composition using, for example, heat, radiation (e.g., actinic radiation), light (e.g., ultraviolet, visible, or infrared light), an electron beam, or a combination of these or like techniques.

Optionally, initiators can be included within the cholesteric liquid crystal composition to initiate polymerization or crosslinking of monomeric components of the composition. Examples of suitable initiators include those that can generate free radicals to initiate and propagate polymerization or crosslinking. Free radical generators can also be chosen according to stability or half-life. Preferably the free radical initiator does not generate any additional color in the cholesteric liquid crystal layer by absorption or other means. Examples of suitable free radical initiators include thermal free radical initiators and photoinitiators. Thermal free radical initiators include, for example peroxides, persulfates, or azonitrile compounds. These free radical initiators generate free radicals upon thermal decomposition.

Photoinitiators can be activated by electromagnetic radiation or particle irradiation. Examples of suitable photoinitiators include, onium salt photoinitiators, organometallic photoinitiators, metal salt cationic photoinitiators, photodecomposable organosilanes, latent sulphonic acids, phosphine oxides, cyclohexyl phenyl ketones, amine substituted acetophenones, and benzophenones. Generally, ultraviolet (UV) irradiation is used to activate the photoinitiator, although other light sources can be used. Photoinitiators can be chosen based on the absorption of particular wavelengths of light.

The cholesteric liquid crystal phase can be achieved using conventional treatments. For example, a method of developing a cholesteric liquid crystal phase includes depositing the cholesteric liquid crystal composition on an oriented substrate. The substrate can be oriented using, for example, drawing techniques or rubbing with a rayon or other cloth. Photoalignment layers are described in U.S. Pat. Nos. 4,974, 941, 5,032,009, 5,389,698, 5,602,661, 5,838,407, and 5,958, 293. After deposition, the cholesteric liquid crystal composition is heated above the glass transition temperature of the composition to the liquid crystal phase. The composition is then cooled below the glass transition temperature and the composition remains in the liquid crystal phase.

Cholesteric Liquid Crystal Optical Bodies

Cholesteric liquid crystal compositions can be formed into a layer that substantially reflects light having one circular polarization (e.g., left or right circularly polarized light) and substantially transmits light having the other circular polarization (e.g., right or left circularly polarized light) over a particular bandwidth of light wavelengths. This characterization describes the reflection or transmission of light directed at normal incidence to the director of the cholesteric liquid crystal material. Light that is directed at other angles will typically be elliptically polarized by the cholesteric liquid crystal material and the Bragg reflection peak is typically blue-shifted from its on-axis wavelength. Cholesteric liquid crystal materials are generally characterized with respect to normally incident light, as done below, however, it will be recognized that the response of these materials can be determined for non-normally incident light using known techniques.

The cholesteric liquid crystal layer can be used alone or in combination with other layers or devices to form an optical body, such as, for example, a reflective polarizer. Cholesteric liquid crystal polarizers are used in one type of reflective polarizer. The pitch of a cholesteric liquid crystal polarizer is similar to the optical layer thickness of multi-layer reflective polarizers. Pitch and optical layer thickness determine the center wavelength of the cholesteric liquid crystal polarizers and multilayer reflective polarizers, respectively. The rotating director of the cholesteric liquid crystal polarizer forms optical repeat units similar to the use of multiple layers having the same optical layer thickness in multilayer reflective polarizers.

The center wavelength, $\lambda_0$, and the spectral bandwidth, $\Delta\lambda$, of the light reflected by the cholesteric liquid crystal layer depend on the pitch, p, of the cholesteric liquid crystal. The center wavelength, $\lambda_0$, is approximated by:

$$\lambda_0 = 0.5(n_o + n_e)p$$

where $n_o$ and $n_e$ are the refractive indices of the cholesteric liquid crystal for light polarized parallel to the director of the liquid crystal ($n_e$) and for light polarized perpendicular to the director of the liquid crystal ($n_o$). The spectral bandwidth, $\Delta\lambda$, is approximated by:

$$\Delta\lambda = 2\lambda_0(n_e - n_o)/(n_e + n_o) = p(n_e - n_o).$$

Cholesteric liquid crystal polarizers have been previously formed by laminating or otherwise stacking two already-formed cholesteric liquid crystal layers, each disposed on an individual substrate, with different pitches (e.g., layers having different compositions, for example, different ratios by weight of chiral and nematic liquid crystal compounds or monomers). These two layers are heated to diffuse liquid crystal material between the layers. The diffusion of material between the two layers typically results in the pitch of the layers varying over a range between the individual pitches of the two layers.

This method, however, requires a substantial number of processing steps including separately forming each layer (e.g., individually drying or curing each layer), stacking (e.g., laminating) the layers, and then heating the layers to cause diffusion of liquid crystal material between the two layers. This also requires substantial processing time, particularly, in view of the time required for diffusion between the two previously formed liquid crystal layers which are typically polymeric in nature.

New Methods of Making Cholesteric Liquid Crystal Optical Bodies

New techniques for making cholesteric liquid crystal optical bodies have been developed. These techniques include one or more of the following features: (i) solvent and material selection to facilitate sequential coating, (ii) use of a reservoir of chiral cholesteric liquid crystal material, and (iii) crosslinking to "fix" the cholesteric liquid crystal layer(s). Each of these features is discussed individually; however, it will be recognized that these features can be used in any combination.

One new method of forming cholesteric liquid crystal optical bodies includes sequentially coating at least two different coating compositions onto a substrate, each of the coating compositions including a different cholesteric liquid crystal composition. After coating, material from the second coating composition is diffused into the first coating composition, followed by final conversion into the cholesteric liquid crystal layer(s). The two different liquid crystal compositions each include a solvent; the two solvents being different. In one embodiment, the cholesteric liquid crystal composition of the first coating composition is not soluble in the solvent used with the second coating composition. The second coating composition includes chiral monomers (e.g., chiral monomers or cholesteric liquid crystal monomers) that can be polymerized to form cholesteric liquid crystals. The first coating composition can include a polymeric or monomeric cholesteric liquid crystal composition.

In the method, the first coating composition is disposed on the substrate using any technique, such as any coating technique. The second coating composition is then disposed on the first coating composition. Because the cholesteric liquid crystal composition of the first coating composition is not substantially soluble in the solvent of the second coating composition, disruption to the first coating composition by the solvent is avoided or reduced. After disposing the second coating composition on the first coating composition, the second coating composition may diffuse into the first coating composition. Optionally, the first coating composition is polymerized, if the composition contains polymerizable material, prior to diffusion. Following diffusion, the solvent of the second coating composition is removed and the compositions are converted into a liquid crystal layer(s).

In another embodiment of this method, the first coating composition includes polymerizable monomers. After disposing the first coating composition on the substrate, the first coating composition is partially or fully polymerized. The second coating composition is disposed on the polymerized first coating composition and the method proceeds as described above. In this embodiment, the polymerized first coating composition should be substantially insoluble in the solvent of the second coating composition. There is no requirement with respect to the solubility of the unpolymerized first coating composition in the solvent of the second coating composition.

In at least some instances, the polymerization of the first coating composition can result in a molecular weight gradient along the thickness direction of the layer formed by the composition. Generally, the molecular weight gradient is prepared so that the highest molecular weight material is near the substrate and lower molecular weight material is near the surface upon which the second coating composition is to be disposed. This gradient can facilitate control of diffusion of the second coating composition into the polymerized first coating composition. Diffusion is typically slower through higher molecular weight material. Other gradients, such as low molecular weight polymer near the substrate and high molecular weight polymer near the other surface, can be used.

A variety of techniques can be used to make the molecular weight gradient. One method includes only partially curing (e.g., polymerizing) the first coating composition. Partial curing can be accomplished by reducing the length or intensity of heating, radiation, light exposure, or a combination thereof. Generally, the source of curing radiation or heat for this technique is placed closest to the surface where the highest molecular weight material is desired. In some instances, the first coating composition includes a material that absorbs the curing radiation to reduce the amount of curing radiation transmitted along the thickness direction. The partial curing can result in the formation of a polymer layer that contains a gradient of molecular weight.

Another method of forming a molecular weight gradient includes curing the first coating composition in an atmosphere containing oxygen (e.g., air or another oxygen gas mixture) or another polymerization termination component. Cholesteric liquid crystal material that is proximal to the surface of the layer in contact with oxygen (e.g., in air) will not polymerize as readily as the surface that is not in contact with oxygen (e.g., the substrate surface). This is particularly true when the polymerization occurs via a free radical process. Oxygen is known to reduce the amount of available free radicals, thereby terminating or otherwise inhibiting polymerization reactions. This oxygen inhibition of polymerization can result in a gradient of polymerized material established along the thickness direction of the layer.

To avoid the effect of oxygen inhibition, polymerization can also take place under conditions where minimal or no oxygen is present, for example, under a nitrogen atmosphere. The presence of nitrogen during polymerization will typically not substantially inhibit the polymerization at the interface. In this instance, the molecular weight is typically uniform and high along the thickness of the layer.

Another method that can be used individually or in combination with the methods discussed herein includes utilizing the second coating composition as a reservoir of chiral material (e.g., chiral compounds, cholesteric liquid crystal compounds or cholesteric liquid crystal monomers). In one embodiment of this method, the second coating composition can be chosen to produce a cholesteric liquid crystal material having a pitch that places its center reflection wavelength outside the desired range of wavelengths to be reflected by the optical body. For example, for visible light reflective polarizers, the second coating composition can be selected to produce a cholesteric liquid crystal material having a pitch that provides for reflection of infrared or ultraviolet light. In addition, the second coating composition is preferably selected to permit faster diffusion of the chiral material than diffusion of non-chiral materials, such as the nematic liquid crystal compounds or monomers. One example is a selection of chiral materials that are more soluble than the non-chiral materials in the previously deposited layer.

Diffusion of the chiral components of the second coating composition into the previously deposited layer will change the ratio of chiral to non-chiral components in the second coating composition. This changes the pitch of a cholesteric liquid crystal material that can be formed from the second coating composition. However, because the center reflection wavelength is outside the desired wavelength range of reflection, the change in pitch does not substantially affect the desired optical properties to be obtained by that portion of the structure formed using the second coating composition. In an alternative embodiment, the second coating composition is not a cholesteric liquid crystal composition, but only contains the chiral component(s) necessary to alter the pitch of a portion of the layer formed using the first coating composition. The concentration, or the percentage of chiral material in the second coating composition can be sufficient so that diffusion the chiral material into the first layer does not reduce the quantity of chiral material necessary to give the desired optical properties of the optical body. As another option, the second coating composition can include diffusible achiral material that can alter the pitch of a cholesteric liquid crystal material formed by the first coating composition. Further examples will be discussed where chiral materials are used for diffusion, however, it will be recognized that the same structures and objective can be achieved using achiral material in place of the chiral materials.

In another method, the second coating composition includes reactive monomer material that can crosslink, in addition to polymerize. Preferably, this reactive monomer material is a reactive chiral monomer and, in some embodiments is a cholesteric liquid crystal compound, a precursor for a cholesteric liquid crystal polymer, or a chiral compound. For example, the reactive monomer material can be a di(meth)acrylate, a diepoxide, a divinyl, or a diallyl ether. When this reactive monomer material diffuses into the previously formed layer, the reactive monomer material can crosslink within that layer as well as within the second coating composition. This "fixes" the cholesteric liquid crystal layer(s) and prevents or substantially reduces any further diffusion of material within the layer(s).

This method and configuration has advantages over previous techniques, in which there was heat-induced diffusion to mix portions of cholesteric liquid crystal polymer layers. In these techniques, the resulting product would continue to experience diffusion between layers of different composition over time, particularly when the product was utilized in an application with substantial heat production, such as many display applications. This continued diffusion resulted in changes in the optical properties of the product over time.

In contrast, the technique disclosed herein for crosslinking the cholesteric liquid crystal layer(s) provides a method for substantially reducing or preventing further diffusion after crosslinking by increasing molecular weight and reducing the availability of monomer materials for diffusion. Thus, the optical properties of the resulting optical body can be substantially stable over time and can be used to produce a more reliable product with a longer lifetime.

The methods described above can be performed using a variety of techniques and equipment. FIG. 1 illustrates an example of a suitable method and device for accomplishing the sequential coating of the two or more coating compositions onto a substrate. A sequential coating apparatus 100 includes a carrier (e.g., a conveyor belt or a sliding platform) that conveys the substrate 200 past a first coating dispenser 104. Alternatively, the substrate 200 can be a continuous web that is pulled through the apparatus 100 through use of drive rolls. The use of drive rolls, or a similar mechanism, for moving the substrate 200 and one or more coating layers can eliminate the necessity for a carrier 102, located underneath the substrate 200. The first coating composition 202 is dispensed through a first coating head 106 and onto the substrate 200. Any coating technique can be used including, for example, knife coating, bar coating, slot coating, gravure coating, roll coating, spray coating, or curtain coating. In one embodiment, the first coating composition 202 includes a solvent and a polymeric liquid crystal material or monomers that can be partially or fully polymerized before coating or after coating to form a polymeric liquid crystal material.

The first coating composition 202 and substrate 200 can optionally pass through a drying oven 108 to remove solvent. Also, the first coating composition 202 and substrate 200 can be passed through a curing station 110 containing, for example, a heat or light source to polymerize (partially or fully) the first coating composition, if the composition contains polymerizable components and it is desired to polymerize those components at this stage of the process. The curing station 110 can be placed at one or more various positions relative to the position of the substrate 200 and first coating composition 202.

A second coating dispenser 112 then dispenses a second coating composition 204 through a second coating head 114 onto the first coating composition 202. Again, any coating technique can be used. Preferably, as discussed above, the layer previously formed from the first coating composition is not substantially soluble in the solvent of the second coating composition. The second coating composition 204 includes a solvent and chiral material (e.g., cholesteric liquid crystal monomer or other chiral compounds or a mixture of nematic (e.g., non-chiral) and chiral liquid crystal monomer or other chiral compounds). At least some of the chiral material of the second coating composition 204 is at least partially soluble in the solvent of the first coating composition. Preferably, the second coating composition contains sufficient chiral material to produce a layer that reflects light outside the desired wavelength range for reflection by the optical body. In this manner, the second coating composition can act as a reservoir for providing chiral material to the layer formed using the first coating composition without decreasing the ability of the subsequently produced optical body to cover the desired wavelength range. Any change in the pitch of cholesteric liquid crystal formed from the second coating composition (if the second coating composition can form a cholesteric liquid crystal) will preferably only be observable outside the desired wavelength range.

When the first and second coating compositions are in contact with one another, the diffusion of the chiral material of the second coating composition into the first coating composition 202 can take place. This diffusion of the chiral material can result in cholesteric liquid crystals that have an intermediate pitch. The intermediate pitch is between the pitches of the cholesteric liquid crystal layers that can be formed from the first and second coating compositions alone.

The rate of diffusion depends upon a variety of factors including, for example, the specific materials used in each composition, the percentages of materials in these compositions, the molecular weight of the materials, the temperature of the compositions, the viscosity of the compositions, and the degree of polymerization of each composition. A desired diffusion rate can be obtained by controlling one or more of these variables, for example, by choice of materials, temperature, viscosity, polymer molecular weight, or a combination of these variables. The first and second coating compositions are optionally placed in an oven 116 or other heating unit to increase the diffusion rate of the chiral material of the second coating composition into the layer formed using the first coating composition. This oven can also be used to partially or fully remove the solvents from the first and second coating compositions, if desired.

After a desired degree of diffusion is achieved, the first and second coating compositions are fully cured using a curing station 118 including, for example, a light or heat source. In one embodiment, as described above, the second coating composition includes a material that can diffuse into the layer formed using the first coating composition and crosslink the materials within that layer and within the second coating composition.

The speed of the substrate 200 and the flow rate of the coating compositions are controlled to provide the desired thickness of each of the compositions 202 and 204. the speed of the substrate 200 can also be controlled to change the duration of treatment by the ovens 108/116 or curing stations 110/118. The devices and methods illustrated in FIG. 1 can be modified to sequentially coat more than two coating compositions onto a substrate. For example, additional coating dispensers, ovens, or light sources can be added to the apparatus.

Figure 2:
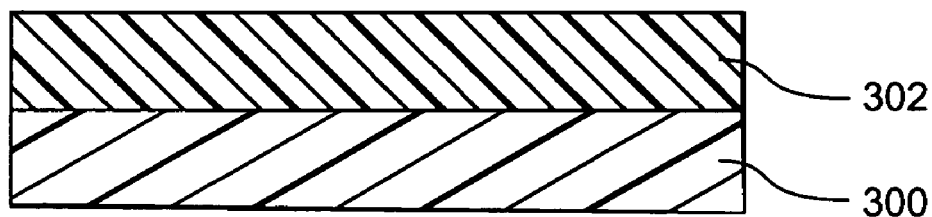
FIG. 2 is a schematic representation of a cross-section of a first coating composition on a substrate, according to the invention.
Figure 3:
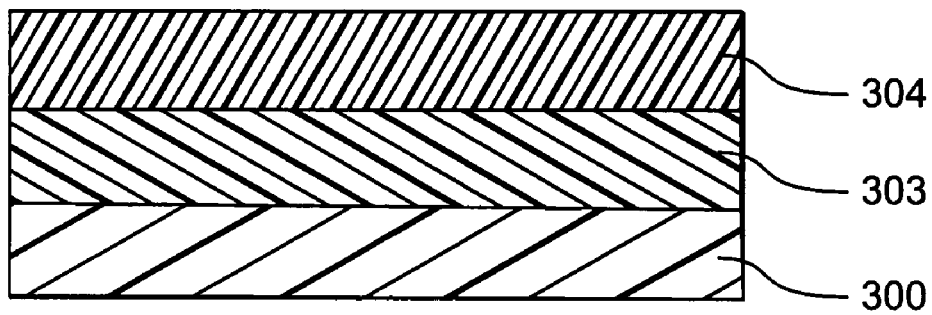
FIG. 3 is a schematic representation of a cross-section of first and second coating compositions on a substrate, according to the invention.
Figure 4:
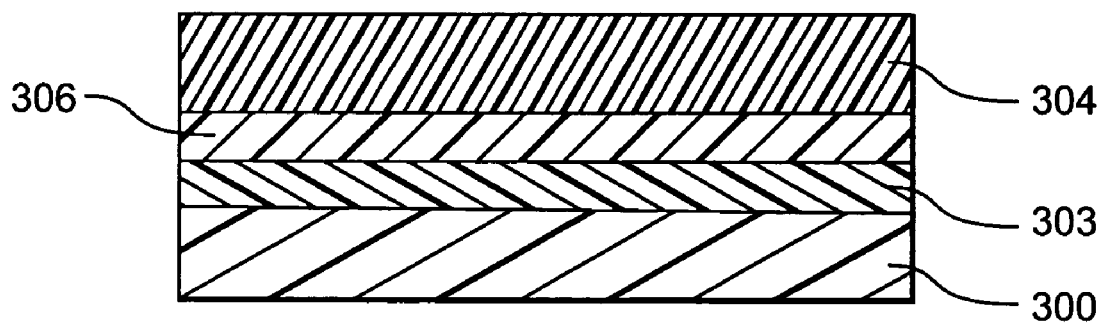
FIG. 4 is a schematic representation of a cross-section of the first and second coating compositions on a substrate with a region of diffusion, according to the invention.

FIGS. 2 to 4 illustrate various stages of the method illustrated by FIG. 1. In one embodiment of the invention, as illustrated in FIG. 2, the first coating composition 302 is polymerized prior to application of the second coating composition. The polymerization optionally results in the formation of a gradient of molecular weight along the thickness direction of the first coating composition. This polymerization can be initiated by the activation of thermolabile free radical initiators or light-sensitive free radical initiators (e.g., photoinitiators). The action of the free radicals can be inhibited by the presence of oxygen, or a suitable compound that can inhibit the action of the free radical, at the surface of the first coating composition. Heat or light for curing can be supplied by the appropriate sources, for example, by an oven or a UV light, respectively. The duration or intensity, or both, of the heat or light can be used to control the extent of polymerization, which, in turn, can affect the gradient of molecular weight. The extent of polymerization can also be controlled by adjusting the relative oxygen content present during the treatment.

As illustrated in FIG. 2, the first coating composition 302 is applied to substrate 300. The first coating composition 302 includes, in a suitable solvent, a polymeric liquid crystal material or monomeric liquid crystal material that can be cured prior to or after coating the second coating composition.

As illustrated in FIG. 3, a second coating composition 304 is applied to the layer 303 formed using the first coating composition. When a molecular weight gradient is used, the molecular weight of the layer 303 typically decreases from the substrate 300/layer 303 interface to the layer 303/second coating composition 304 interface. The second coating composition 304 includes at least one chiral monomer which can diffuse into the layer 303. The rate and extent of the diffusion of the chiral compound can be limited by the gradient of molecular weight.

As illustrated in FIG. 4, diffusion occurs from the second coating composition 304 into layer 303 which is coated on the substrate 300 to form a region 306 in which the pitch of the cholesteric liquid crystal material formed from the first and second compositions varies along a thickness dimension. This region 306 can extend through only a portion of the original layer 303, as illustrated in FIG. 4, or through the entire layer 303.

In some embodiments in which the coating compositions include monomers that are polymerized to form the cholesteric liquid crystal layer, the monomers can be partially polymerized before, during, or after coating, but before completing the diffusion between the two coating compositions. For example, one or more curing light or radiation sources can be positioned at one or more points along the processing path to partially cure (e.g., polymerize or crosslink) the monomers at particular rates. This can be done to alter the diffusion rate and control the pitch profile in the final cholesteric liquid crystal layer(s).

As an example, a broadband reflective polarizer can be formed according to the methods and configurations described herein. This broadband reflective polarizer can substantially uniformly (e.g., with no more than about 10% or 5% variation) reflect light of one polarization over a wavelength range of 100 nm, 200 nm, or 300 nm or more. In particular, a broadband reflective polarizer can be formed that substantially uniformly reflects light of one polarization over the visible wavelength range (e.g., from about 400 to 750 nm).

DISPLAY EXAMPLES

Figure 5:
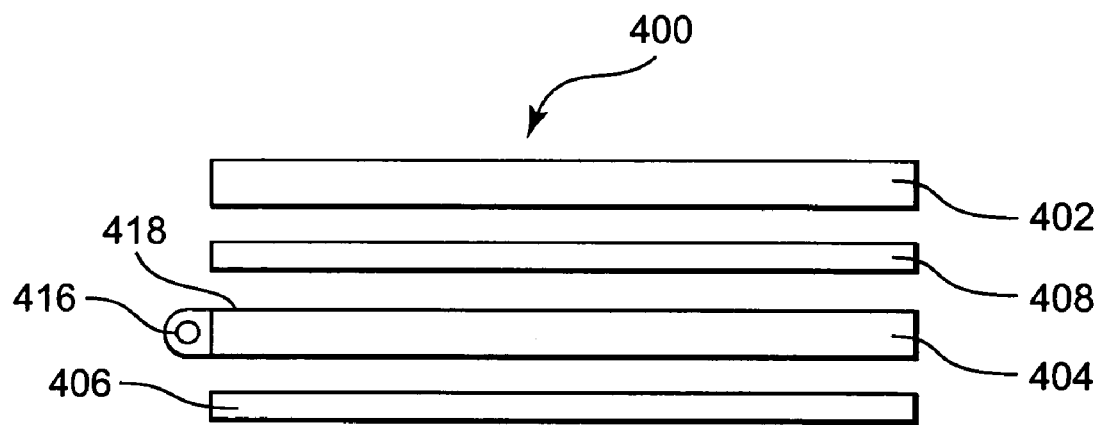
FIG. 5 is a schematic illustration of one embodiment of a liquid crystal display, according to the invention.

The cholesteric liquid crystal optical bodies can be used in a variety of optical displays and other applications, including transmissive (e.g., backlit), reflective, and transflective displays. For example, FIG. 5 illustrates a schematic cross-sectional view of one illustrative backlit display system 400 including a display medium 402, a backlight 404, a cholesteric liquid crystal reflective polarizer 408, as described above, and an optional reflector 406. The display system optionally includes a quarter wave plate as part of the cholesteric liquid crystal reflective polarizer or as a separate component to convert the circularly polarized light from the liquid crystal reflective polarizer to linearly polarized light. A viewer is located on the side of the display device 402 that is opposite from the backlight 404.

The display medium 402 displays information or images to the viewer by transmitting light that is emitted from the backlight 404. One example of a display medium 402 is a liquid crystal display (LCD) that transmits only light of one polarization state.

The backlight 404 that supplies the light used to view the display system 400 includes, for example, a light source 416 and a light guide 418, although other backlighting systems can be used. Although the light guide 418 depicted in FIG. 5 has a generally rectangular cross-section, backlights can use light guides with any suitable shape. For example, the light guide 418 can be wedge-shaped, channeled, a pseudo-wedge guide, etc. The primary consideration is that the light guide 418 be capable of receiving light from the light source 416 and emitting that light. As a result, the light 418 can include back reflectors (e.g., optional reflector 406), extraction mechanisms and other components to achieve the desired functions.

The reflective polarizer 408 is an optical film that includes at least one cholesteric liquid crystal optical body, as described above. The reflective polarizer 408 is provided to substantially transmit light of one polarization state exiting the light guide 418 and substantially reflect light of a different polarization state exiting the light guide 418.

Figure 6:
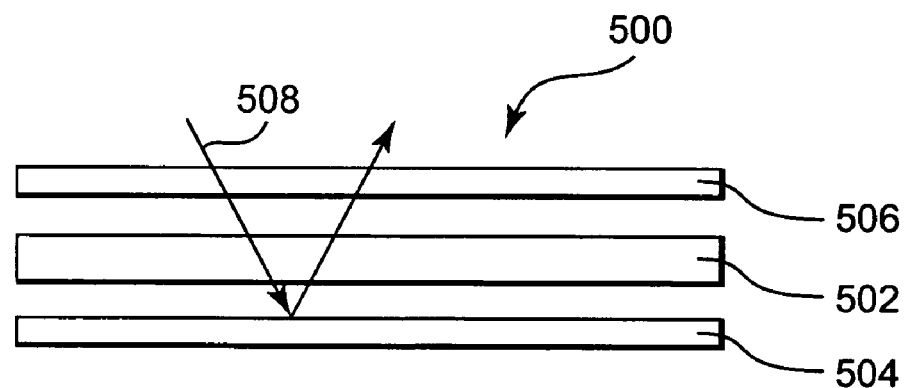
FIG. 6 is a schematic illustration of another embodiment of a liquid crystal display, according to the invention.

FIG. 6 is a schematic illustration of one type of reflective liquid crystal display 500. This reflective liquid crystal display 500 includes a display medium 502, a mirror 504, and a reflective polarizer 506. The display system optionally includes a quarter wave plate as part of the cholesteric liquid crystal reflective polarizer or as a separate component to convert the circularly polarized light from the liquid crystal reflective polarizer to linearly polarized light. Light 508 is polarized by the reflective polarizer, travels through the display medium, bounces off the mirror, and goes back through the display medium and reflective polarizer. The reflective polarizer of this reflective liquid crystal display 500 includes one cholesteric liquid crystal optical body, as described above. The specific choice of cholesteric liquid crystal optical body can depend on factors such as, for example, cost, size, thickness, materials, and wavelength range of interest.

The cholesteric liquid crystal optical body can be used with a variety of other components and films that enhance or provide other properties to a liquid crystal display. Such components and films include, for example, brightness enhancement films, retardation plates including quarter-wave plates and films, multilayer or continuous/disperse phase reflective polarizers, metallized back reflectors, prismatic back reflectors, diffusely reflecting back reflectors, multilayer dielectric back reflectors, and holographic back reflectors.

EXAMPLE 1

Different coating solutions were prepared for the coating procedure. The composition of these coating solutions is listed in Table 1. Coating solution 4 is a mixture of solutions 1 and 2. Tetrahydrofuran (THF) and methyl ethyl ketone (MEK) (both available from Aldrich Chemical Co., Milwaukee, Wis.) were used as the solvents. The preparation of Compound A is described in European Patent Application Publication No. 834754, which is incorporated herein by reference. The structure of Compound A is:

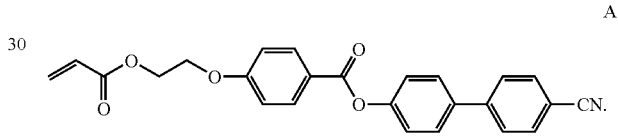

A

Compound 756 (Paliocolor™ LC 756) and Compound 242 (Paliocolor™ LC 242) are liquid crystal monomers available from BASF Corp. (Ludwigshafen, Germany). Darocur™ 4265 (Ciba Geigy Corp., Basel, Switzerland) is a photoinitiator. Vazo™ 52 (DuPont, Wilmington, Del.) is a thermally decomposable substituted azonitrile compound used as a free radical initiator. The substrate used for coating had an alignment layer on it consisting of stretched (by a factor of 6.8) polyvinyl alcohol (PVA) (Airvol 425, Air Products, Allentown, Pa.).

Coating solution 1 was prepared by dissolving the compounds of coating solution 1, as listed in Table 1, in THF at 60° C. Coating solution 1 was then purged with nitrogen gas, sealed in a container, and heated at 60° C. for 16 hours in order for polymerization of the liquid crystal monomer to occur. Coating solutions 2 and 3 were prepared by dissolving the indicated compounds in the solvents at 60° C. Coating solution 4 was prepared by mixing solutions 1 and 2, and then adding the photoinitiator at room temperature.

The optical body was prepared by applying coating solution 4 on the PVA substrate using a #20 wire wrapped rod. Coating solution 4 was applied to give a thickness, when dried, of approximately 7.5 micrometers. The coating was air dried for 5 minutes at room temperature and then placed into a 110° C. oven for 10 minutes to align the polymer. Next, the coating was UV cured in air using a 300 watt/in. Fusion™ conveyor UV curing system (Fusion MC-6RQN; Fusion UV Systems, Inc., Gaithersburg, Md.) and a Fusion™ D lamp. The dose was approximately 1.5 J/cm². The coating was cured at 20 ft/min. using two passes.

Coating solution 3 was subsequently applied onto cured coating solution 4 also using a #14 wire wrapped rod. The coating was again air dried 5 minutes at room temperature. Coating solution 3 was applied to give a thickness, when dried, of approximately 5 micrometers. The substrate containing the two coatings was placed into a 90° C. oven for 15 min. to allow diffusion of the coating compositions to occur. The substrate containing the two coatings was again UV cured in air using the 300 watt/in. Fusion™ conveyor UV curing system. The dose was approximately 1.5 J/cm$^2$. The coating was cured at 20 ft/min. using two passes.

Figure 7:
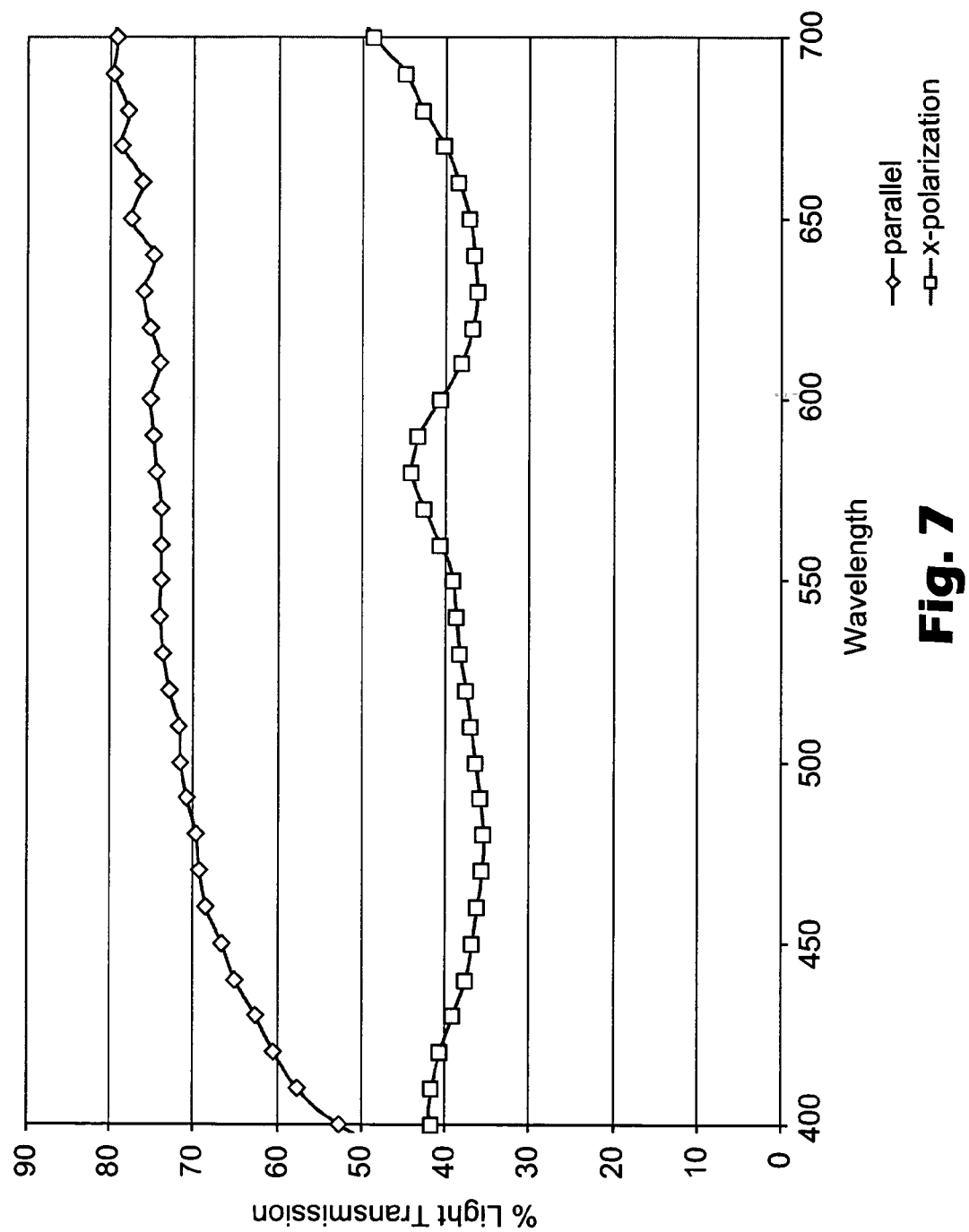
FIG. 7 is a light transmission spectrum of an optical body formed according to Example 1.

Finally, a Lambda™ 900 spectrophotometer (Perkin Elmer, Santa Clara, Calif.) was used to measure the optical performance of the optical body. A quarter-wave film was placed in front of the coating and a standard linear polarizer was placed in the light path and the transmission through the coating was measured in a range from 400 nm to 700 nm. The transmission was measured with the linear polarizer rotated both +45° and −45° from the quarter-wave film to give parallel and cross-polarization results. The results of this transmission over the measured wavelength range are indicated in FIG. 7.

EXAMPLE 2

Coating solution 5 was prepared by dissolving the compounds of coating solution 5, as listed in Table 1, in THF at 60° C. Coating solution 5 was then purged with nitrogen gas, sealed in a container, and heated at 60° C. for 16 hours in order for polymerization of the liquid crystal monomer to occur. Coating solutions 6 and 7 were prepared by dissolving the indicated compounds in the solvents at 60° C. Coating solution 10 was prepared by mixing solutions 5 and 6, and then adding Lucirin™ TPO (BASF Corp., Ludwigshafen, Germany), at room temperature.

An optical body was prepared by applying coating solution 10 on the PVA substrate using a #26 wire wrapped rod. Coating solution 10 was applied to give a thickness, when dried, of approximately 10 micrometers. The coating was air dried for 5 minutes at room temperature and then placed into a 115° C. oven for 10 minutes to align the polymer. Next, the coating was UV cured in air using a 300 watt/in. Fusion™ conveyor UV curing system (Fusion MC-6RQN) and a Fusion™ H bulb. The dose was approximately 1.2 J/cm$^2$. The coating was cured at 20 ft/min. using three passes from the backside of the film.

Coating solution 7 was subsequently applied onto cured coating solution 10 using a #14 wire wrapped rod. The coating was again air dried 5 minutes at room temperature. Coating solution 7 was applied to give a thickness, when dried, of approximately 5 micrometers. The substrate containing the two coatings was placed into a 105° C. oven for 6 min. to allow diffusion of the coating compositions to occur. The substrate containing the two coatings was again UV cured in air using the 300 watt/in. Fusion™ conveyor UV curing system and a Fusion D bulb under a nitrogen atmosphere. The coating was cured at 20 ft/min. using two passes.

Figure 8:
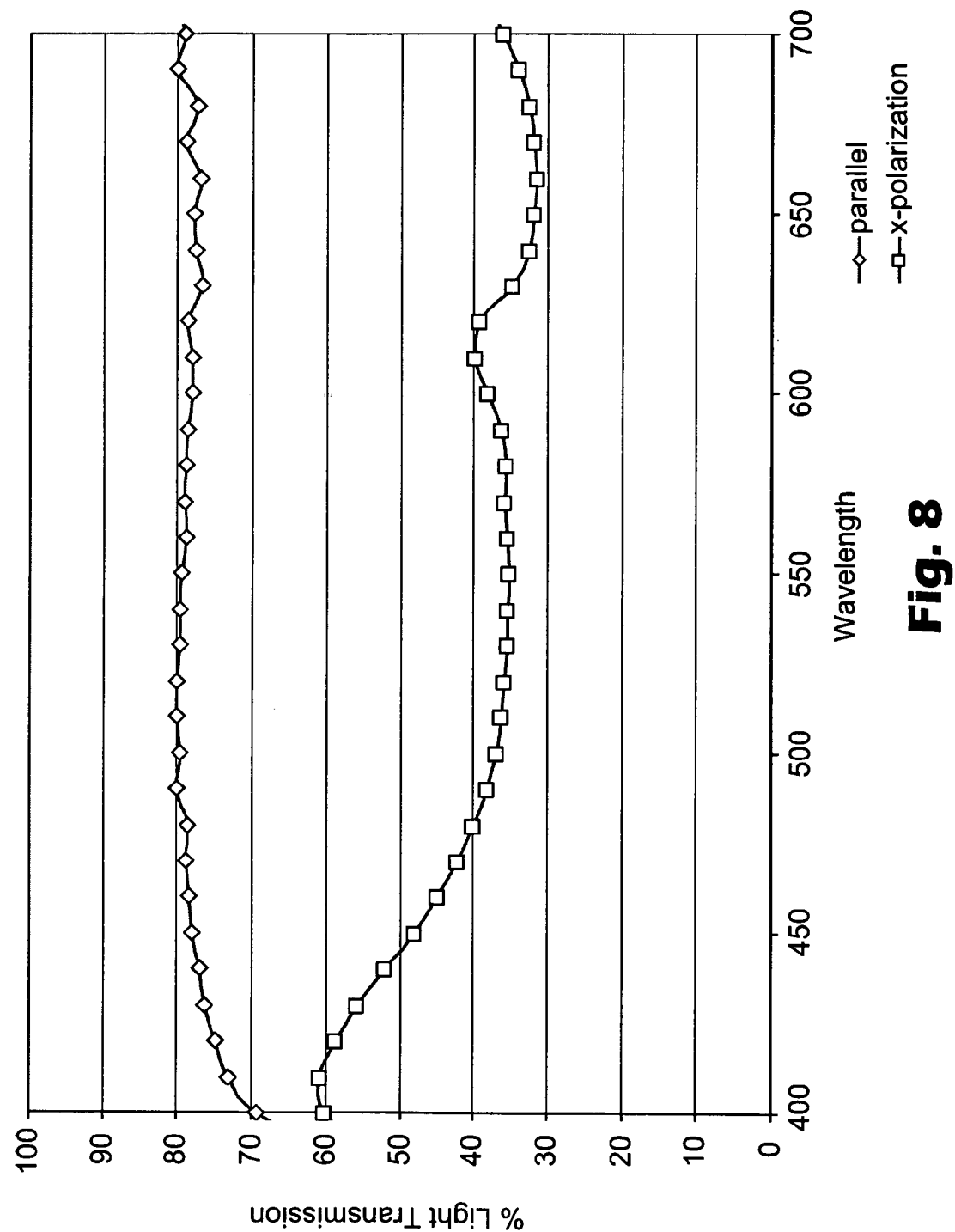
FIG. 8 is a light transmission spectrum of an optical body formed according to Example 2.

Finally, a Lambda™ 900 spectrophotometer (Perkin Elmer, Santa Clara, Calif.) was used to measure the optical performance of the optical body. A quarter-wave film was placed in front of the coating and a standard linear polarizer was placed in the light path and the transmission through the coating was measured in a range from 400 nm to 700 nm. The transmission was measured with the linear polarizer rotated both +45° and −45° from the quarter-wave film to give parallel and cross-polarization results. The results of this transmission over the measured wavelength range are indicated in FIG. 8.

EXAMPLE 3

Coating solution 8 was prepared by dissolving the compounds of coating solution 8, as listed in Table 1, in THF at 60° C. Coating solution 8 was then purged with nitrogen gas, sealed in a container, and heated at 60° C. for 16 hours in order for polymerization of the liquid crystal monomer to occur. Coating solutions 9 and 12 were prepared by dissolving the indicated compounds in the solvents at 60° C. Coating solution 11 was prepared by mixing solutions 8 and 9, and then adding the photoinitiator at room temperature.

The optical body was prepared by applying coating solution 11 on the PVA substrate using a #20 wire wrapped rod. Coating solution 11 was applied to give a thickness, when dried, of approximately 7.5 micrometers. The coating was air dried for 5 minutes at room temperature and then placed into a 120° C. oven for 10 minutes to align the polymer. Next, the coating was UV cured in air using a 300 watt/in. Fusion™ conveyor UV curing system (Fusion MC-6RQN) and a Fusion™ D lamp. The dose was approximately 1.5 J/cm$^2$. The coating was cured at 20 ft/min. using two passes from the backside of the film.

Coating solution 12 was subsequently applied onto cured coating solution 11 also using a #20 wire wrapped rod. The coating was again air dried 5 minutes at room temperature. Coating solution 12 was applied to give a thickness, when dried, of approximately 7.5 micrometers. The substrate containing the two coatings was placed into a 80° C. oven for 10 min. to allow diffusion of the coating compositions to occur. The substrate containing the two coatings was again UV cured using the 300 watt/in. Fusion™ conveyor UV curing system under a nitrogen atmosphere. The dose was approximately 1.5J/cm$^2$. The coating was cured at 20 ft/min. using two passes.

Figure 9:
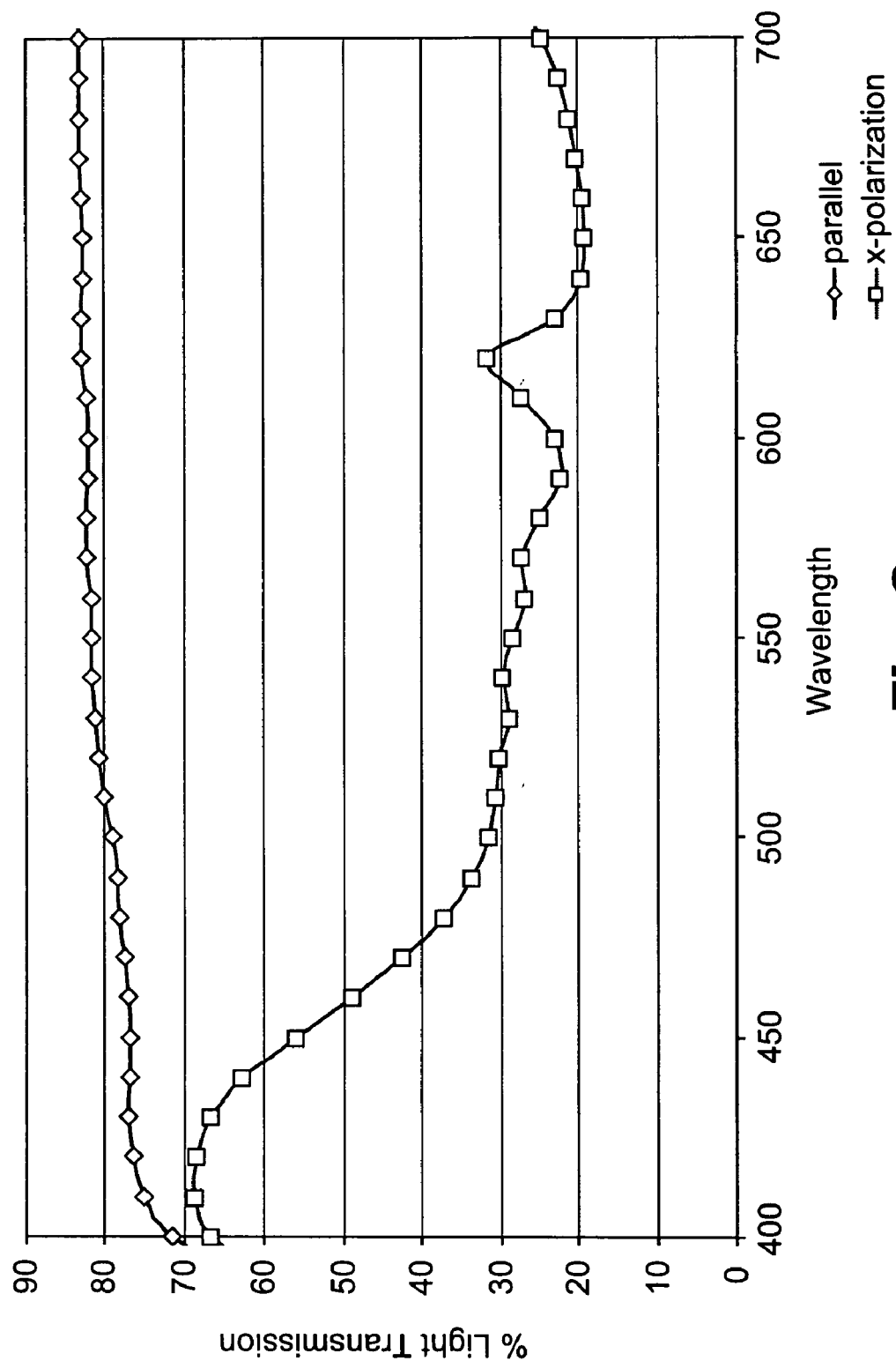
FIG. 9 is a light transmission spectrum of an optical body formed according to Example 3.

Finally, a Lambda™ 900 spectrophotometer (Perkin Elmer, Santa Clara, Calif.) was used to measure the optical performance of the optical body. A quarter-wave film was placed in front of the coating and a standard linear polarizer was placed in the light path and the transmission through the coating was measured in a range from 400 nm to 700 nm. The transmission was measured with the linear polarizer rotated both +45° and −45° from the quarter-wave film to give parallel and cross-polarization results. The results of this transmission over the measured wavelength range are indicated in FIG. 9.

EXAMPLE 4

Coating solution 13 was prepared by dissolving the compounds of coating solution 13, as listed in Table 1, in THF at 60° C. Coating solution 13 was then purged with nitrogen gas, sealed in a container, and heated at 60° C. for 16 hours in order for polymerization of the liquid crystal monomer to occur. Coating solution 12 was prepared as indicated above.

The optical body was prepared by applying coating solution 13 on the PVA substrate using a #16 wire wrapped rod. Coating solution 13 was applied to give a thickness, when dried, of approximately 6 micrometers. The coating was air dried for 5 minutes at room temperature and then placed into a 130° C. oven for 10 minutes to align the polymer. Next, coating solution 12 was subsequently applied onto coating solution 13 also using a #16 wire wrapped rod. The coating was again air dried 5 minutes at room temperature. Coating solution 12 was applied to give a thickness, when dried, of approximately 6 micrometers. The substrate containing the two coatings was placed into a 90° C. oven for 7 min. to allow diffusion of the coating compositions to occur. The substrate containing the two coatings was then UV cured using the 300 watt/in. Fusion conveyor UV curing system under a nitrogen atmosphere. The dose was approximately 1.5J/cm$^2$. The coating was cured at 20 ft/min. using two passes.

Figure 10:
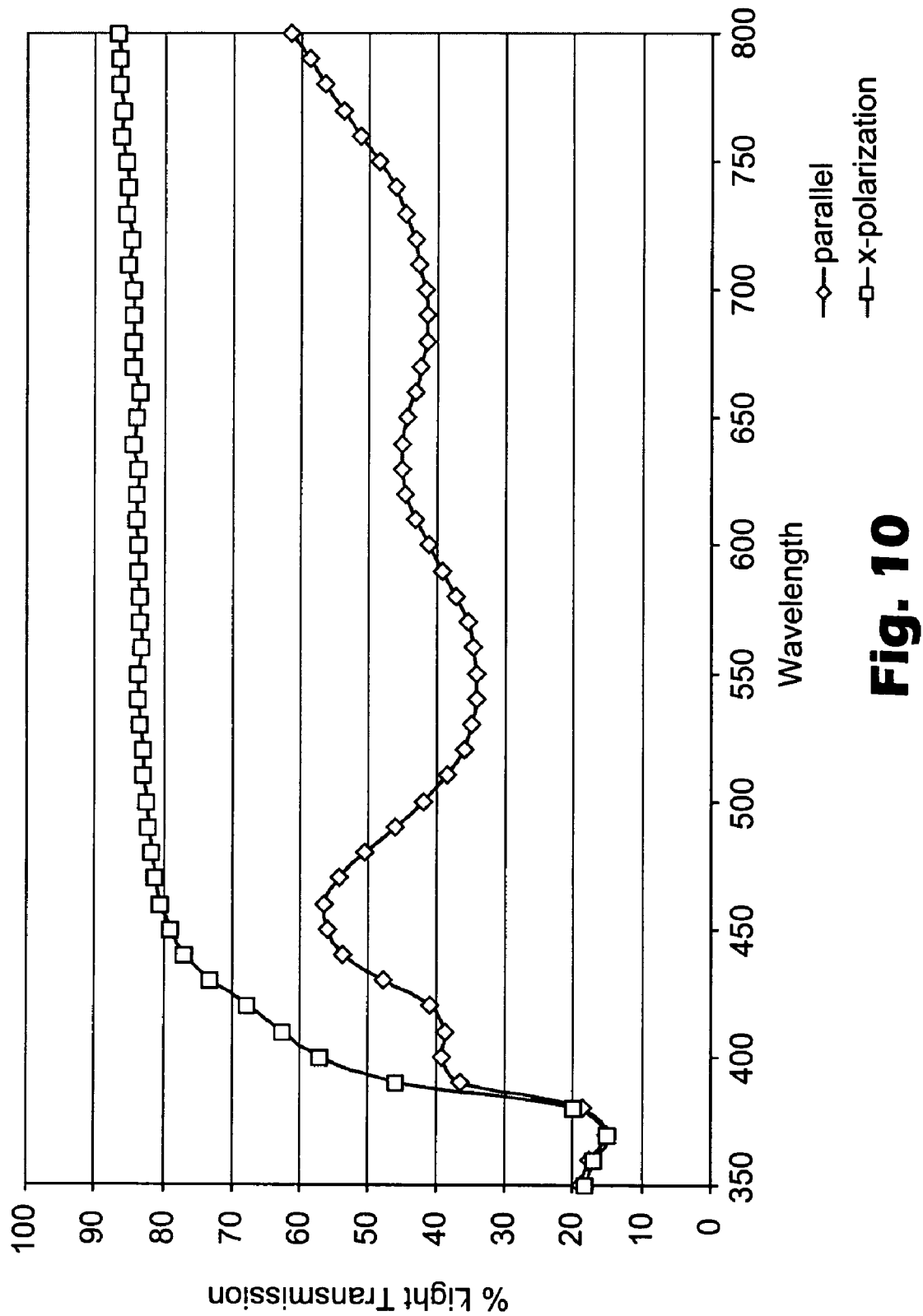
FIG. 10 is a light transmission spectrum of an optical body formed according to Example 4.

Finally, a Lambda™ 900 spectrophotometer (Perkin Elmer, Santa Clara, Calif.) was used to measure the optical performance of the optical body. A quarter-wave film was placed in front of the coating and a standard linear polarizer was placed in the light path and the transmission through the coating was measured in a range from 400 nm to 700 nm. The transmission was measured with the linear polarizer rotated both +45° and −45° from the quarter-wave film to give parallel and cross-polarization results. The results of this transmission over the measured wavelength range are indicated in FIG. 10.

TABLE 1

Solutions
(Weight % based on Total Weight of Solution)

|         | 1     | 2     | 3    | 5    | 6    | 7    | 8     | 9     | 12    | 13   |
|---------|-------|-------|------|------|------|------|-------|-------|-------|------|
| Cmpd.A  | 14.25 | 14.25 | —    | 14.3 | 14.3 | —    | 14.35 | 14.35 | —     | 14.4 |
| LC756   | 0.75  | 0.75  | 1.5  | 0.7  | 0.7  | 1.8  | 0.675 | 0.675 | 1.05  | 0.6  |
| LC242   | —     | —     | 13.5 | —    | —    | 13.2 | —     | —     | 13.95 | —    |
| THF     | 85    | 85    | —    | 85   | 85   | —    | 85    | 85    | —     | 85   |
| MEK     | —     | —     | 85   | —    | —    | 85   | —     | —     | 85    | —    |
| Dar.4265| —     | —     | 0.3  | —    | —    | 45   | —     | —     | 0.3   | —    |
| Vazo 52 | 0.8   | —     | —    | 0.6  | —    | —    | 0.4   | —     | —     | 0.4  |

TABLE 2

(Weight % based on Total Weight of Solutions from Table 1)

|           | 4     | 10    | 11    |
|-----------|-------|-------|-------|
| Soln. 1   | 70%   | —     | —     |
| Soln. 2   | 30%   | —     | —     |
| Dar. 4265 | 0.6%  | —     | 0.30% |
| Soln. 5   | —     | 70%   | —     |
| Soln. 6   | —     | 30%   | —     |
| Soln. 8   | —     | —     | 70%   |
| Soln. 9   | —     | —     | 30%   |
| TPO       | —     | 0.45% | —     |

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the instant specification.

What is claimed is:

1. An optical body, comprising:
    a substrate;
    a first cholesteric liquid crystal region consisting essentially of a layer of a first cholesteric liquid crystal material disposed on the substrate;
    a second cholesteric liquid crystal region comprising cross-linked first chiral monomers; and
    a third cholesteric liquid crystal region disposed between the first and second regions and comprising the first cholesteric liquid crystal material and the first chiral monomers, the chiral monomers in the third region being crosslinked to the chiral monomers in the second region,
    wherein the third cholesteric liquid crystal region has a non-uniform pitch along a thickness direction of the cholesteric liquid crystal region.

2. The optical body of claim 1, wherein the pitch of at least a portion of the third cholesteric liquid crystal region changes monotonically along a thickness direction.

3. An optical display, comprising: a display medium; a reflective polarizer comprising a substrate; and an optical body of claim 2 disposed on the substrate.

4. The optical body of claim 1, wherein at least a portion of the first cholesteric liquid crystal region adjacent the substrate has a uniform pitch.

5. An optical display, comprising: a display medium; a reflective polarizer comprising a substrate; and an optical body of claim 4 disposed on the substrate.

6. The optical body of claim 1, wherein a portion of the second cholesteric liquid crystal region has a pitch such that the portion reflects light having a wavelength outside of a range from 400 to 750 nm.

7. An optical display, comprising: a display medium; a reflective polarizer comprising a substrate; and an optical body of claim 6 disposed on the substrate.

8. The optical body of claim 1, wherein the third region comprises a molecular weigh gradient in the thickness direction with the highest molecular weight being adjacent the first region and the lowest molecular weight being adjacent the second region.

9. An optical display, comprising: a display medium; a reflective polarizer comprising a substrate; and an optical body of claim 8 disposed on the substrate.

10. An optical display, comprising:
    a display medium;
    a reflective polarizer comprising a substrate;
    a first cholesteric liquid crystal region consisting essentially of a layer of first cholesteric liquid crystal material disposed on the substrate;
    a second cholesteric liquid crystal region comprising cross-linked first chiral monomers; and
    a third cholesteric liquid crystal region disposed between the first and second regions and comprising the first cholesteric liquid crystal material and the first chiral monomers, the chiral monomers in the third region being crosslinked to the chiral monomers in the second region,
    wherein the third cholesteric liquid crystal region has a non-uniform pitch along a thickness direction of the cholesteric liquid crystal region.

* * * * *